US00RE42723E

(19) United States
(12) Reissued Patent
Baratono et al.

(10) Patent Number: US RE42,723 E
(45) Date of Reissued Patent: Sep. 20, 2011

(54) COMBINED REAR VIEW MIRROR AND TELEPHONE

(75) Inventors: Ronald Baratono, Allen Park, MI (US); Mosad Abbas, Uckfield (GB)

(73) Assignee: Akihabara Limited LLC, Wilmington, DE (US)

(21) Appl. No.: 11/799,758

(22) Filed: May 2, 2007
(Under 37 CFR 1.47)

Related U.S. Patent Documents

Reissue of:
(64) Patent No.: 6,889,064
Issued: May 3, 2005
Appl. No.: 10/013,589
Filed: Dec. 11, 2001

U.S. Applications:
(63) Continuation-in-part of application No. 09/735,455, filed on Dec. 12, 2000, now Pat. No. 6,625,426, which is a continuation-in-part of application No. 09/532,859, filed on Mar. 22, 2000, now Pat. No. 6,549,793.

(51) Int. Cl.
*H04M 1/00* (2006.01)

(52) U.S. Cl. ..... 455/569.2; 455/575.2; 455/90.3; 455/344; 340/815.4

(58) Field of Classification Search ..... 455/550.1, 455/566, 569.1, 569.2, 575.1, 575.2, 90.1, 455/90.3, 344, 345, 347, 351; 340/425.5, 340/815.4, 815.73
See application file for complete search history.

(56) References Cited

U.S. PATENT DOCUMENTS

| | | | | |
|---|---|---|---|---|
| 5,566,224 | A | 10/1996 | ul Azam et al. | 455/566 |
| 5,617,251 | A | 4/1997 | Ohta et al. | 359/599 |
| 5,649,317 | A | 7/1997 | Suzuki | 455/90 |
| 5,798,688 | A | 8/1998 | Schofield | 340/438 |
| 5,878,353 | A | 3/1999 | ul Azam et al. | 455/566 |
| 5,898,932 | A | 4/1999 | Zurlo et al. | 455/575 |
| 5,940,503 | A | 8/1999 | Palett et al. | 379/454 |
| 6,019,475 | A | 2/2000 | Lynam et al. | 359/879 |

(Continued)

FOREIGN PATENT DOCUMENTS

DE 43 19 961 12/1994
(Continued)

OTHER PUBLICATIONS

McCarthy et al., U.S. Appl. No. 2001/0055165 A1, Dec. 27, 2001.*

*Primary Examiner* — Thanh C Le
(74) *Attorney, Agent, or Firm* — Woodcock Washburn LLP

(57) ABSTRACT

A mobile telephone or cellular telephone unit and a rear view mirror housing of an automobile are combined to provide an improved telephone apparatus that enables a hands-free use by a driver while operating the vehicle, the improved telephone apparatus includes a rear view mirror housing, the housing including a rear view mirror, telephone and SIM card for sending and receiving telephone calls and instant video image, the image display and SIM card are removably connected thereto. A telephone key pad is cooperatively connected to the telephone for dialing the telephone. An attachment bracket attaches the mirror housing to the vehicle. The housing has the electronic circuitry incorporated therewith to which a telephone and video assembly is connectable. A remote device, and computer process to communicate with the motor vehicle without the need for an automated hub, or Network Operating Center (NOC).

14 Claims, 4 Drawing Sheets

U.S. PATENT DOCUMENTS

| | | | | |
|---|---|---|---|---|
| 6,062,887 | A | 5/2000 | Schuster et al. | 439/218 |
| 6,154,663 | A | 11/2000 | Itamochi | 455/569.2 |
| 6,278,884 | B1 | 8/2001 | Kim | 455/556.1 |
| 6,366,213 | B2 | 4/2002 | DeLine et al. | 340/815.4 |
| 6,386,742 | B1 | 5/2002 | DeLine et al. | 362/494 |
| 6,389,340 | B1 | 5/2002 | Rayner | 701/35 |
| 6,428,172 | B1 | 8/2002 | Hutzel et al. | 359/838 |
| 6,549,793 | B1 | 4/2003 | Baratono | 455/569.2 |
| 6,693,517 | B2 | 2/2004 | McCarthy et al. | 340/425.5 |
| 6,906,632 | B2 | 6/2005 | DeLine et al. | 340/815.4 |
| 6,909,361 | B2 | 6/2005 | McCarthy et al. | 340/425.5 |
| 7,054,660 | B2 | 5/2006 | Lord | 455/558 |
| 7,188,963 | B2 | 3/2007 | Schofield et al. | 359/876 |
| 2004/0106427 | A1 | 6/2004 | Collavo et al. | 455/550.1 |

FOREIGN PATENT DOCUMENTS

| | | |
|---|---|---|
| GB | 2292857 | 3/1996 |
| JP | 11-028980 | 5/1999 |
| WO | WO 99/66647 | 12/1999 |
| WO | WO 99/66647 A1 * | 12/1999 |

* cited by examiner

FIG 1
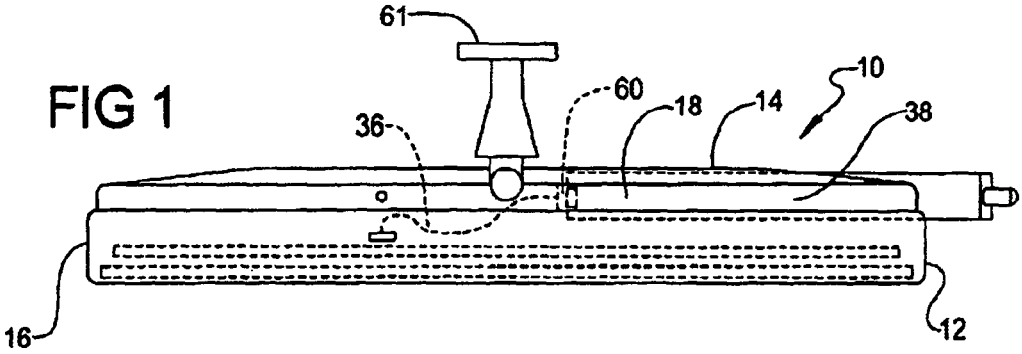
FIG 2
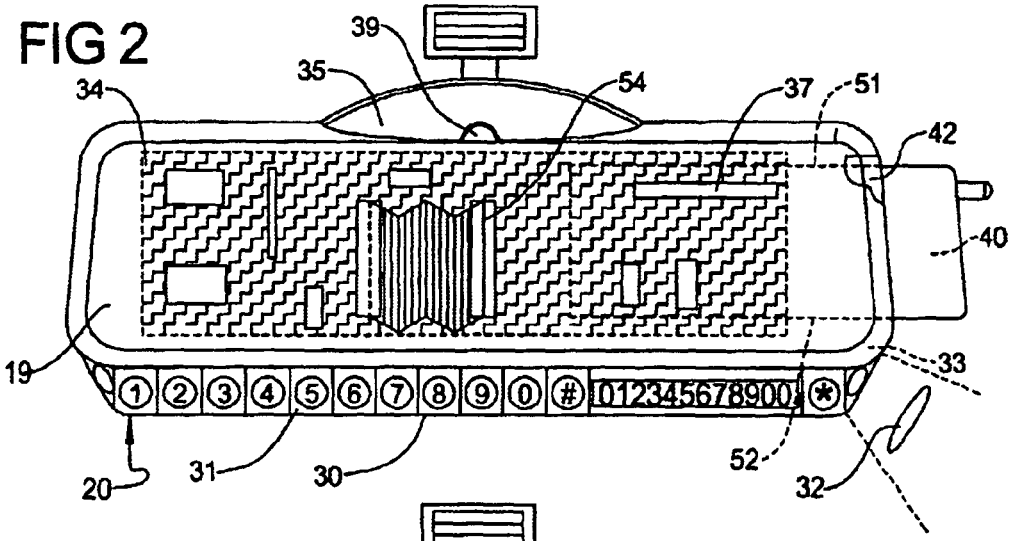
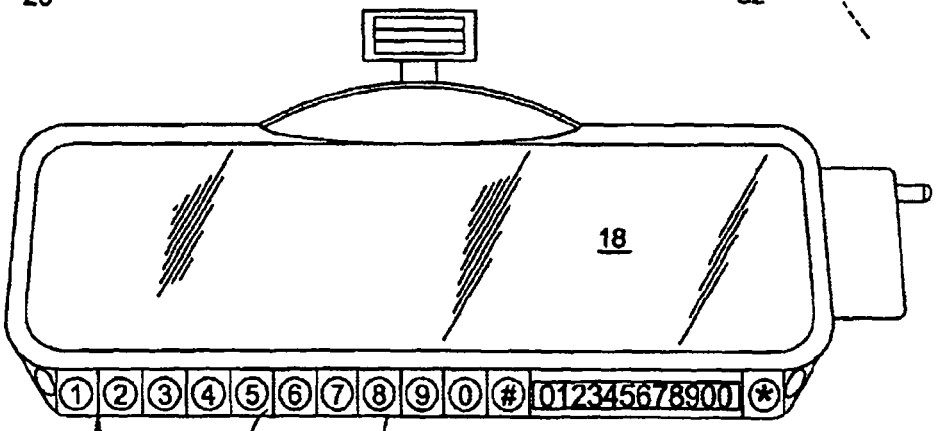
FIG 3

FIG 4
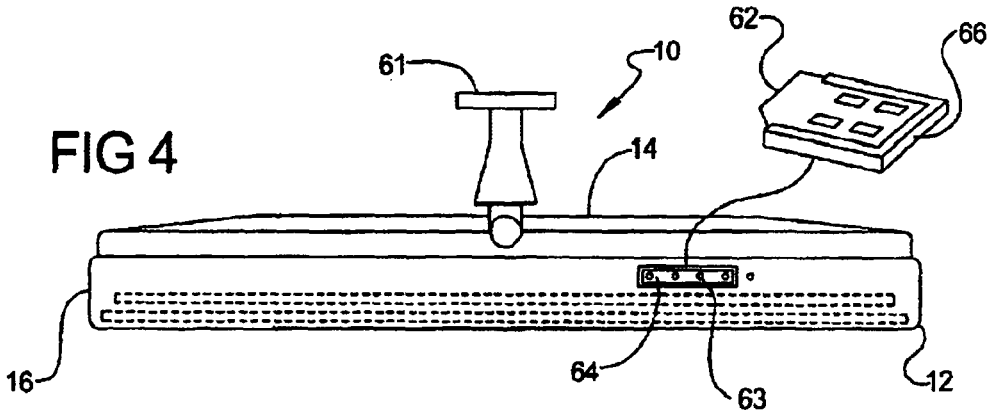
FIG 5
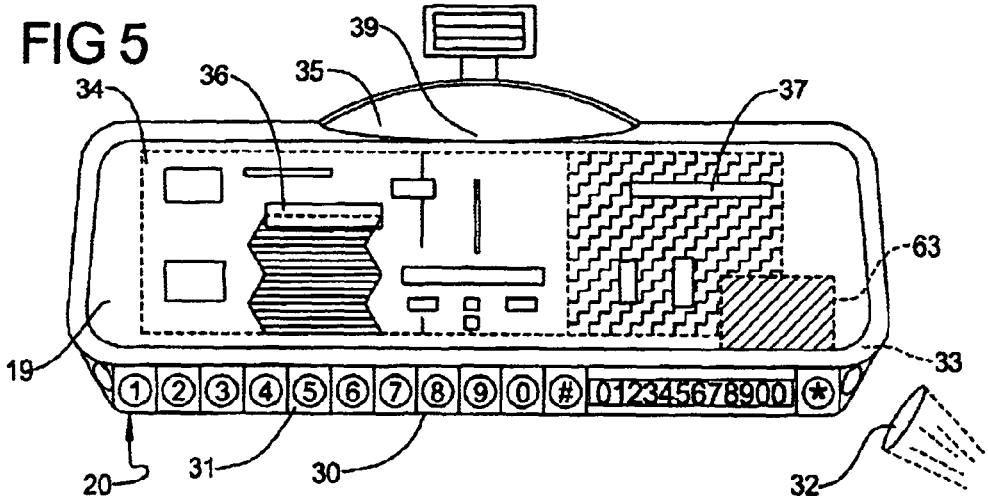
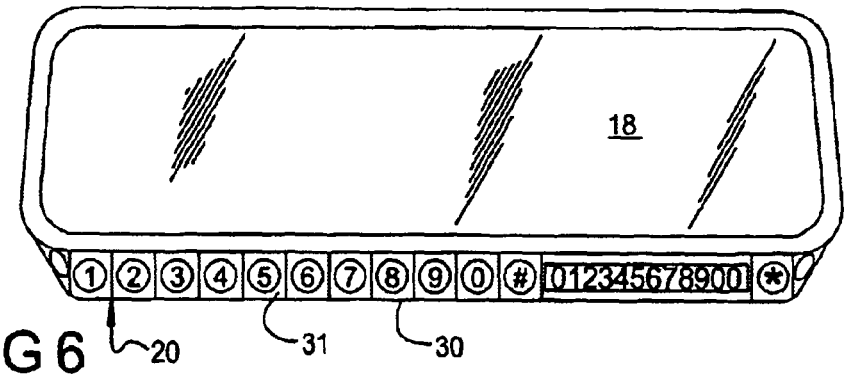
FIG 6

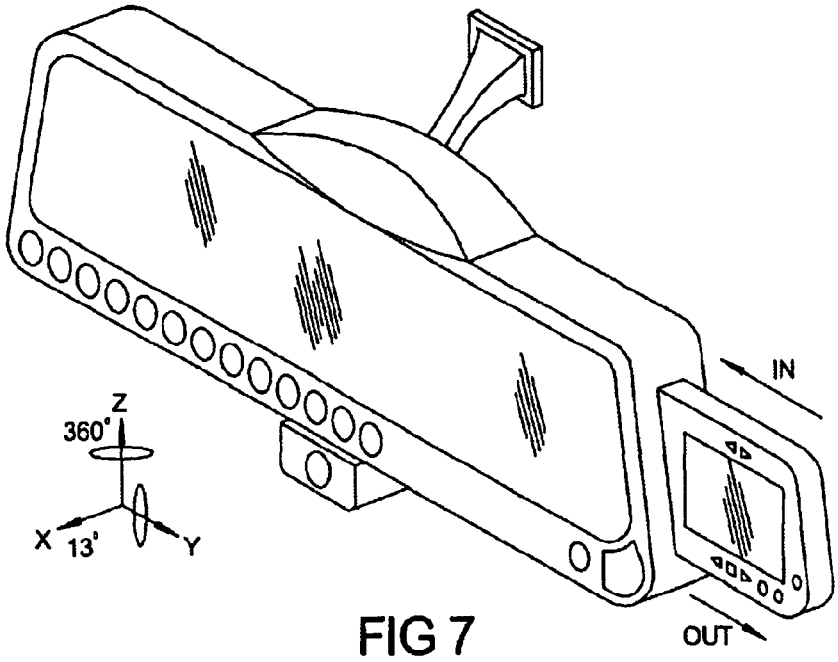
FIG 7
FIG 8
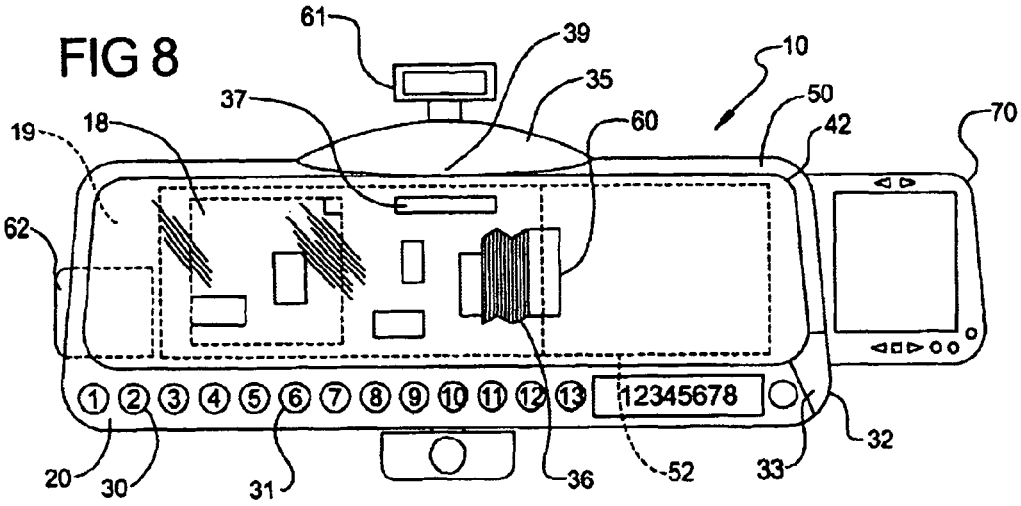

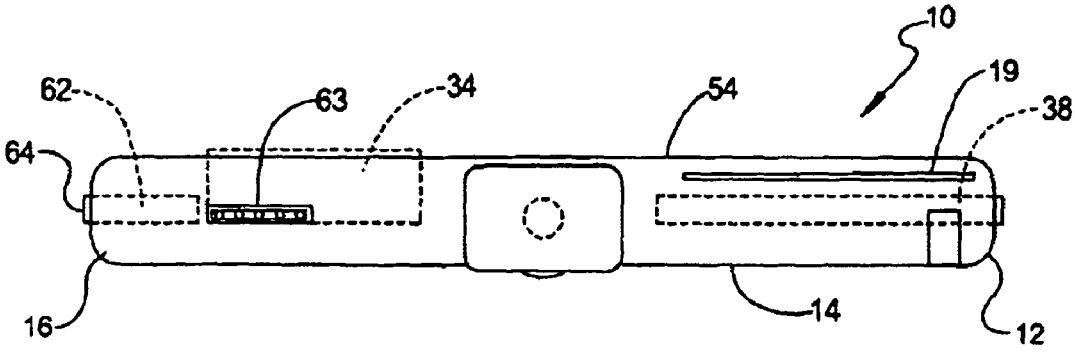
FIG 9
FIG 10
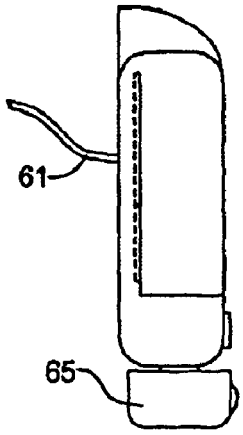

COMBINED REAR VIEW MIRROR AND TELEPHONE

Matter enclosed in heavy brackets [ ] appears in the original patent but forms no part of this reissue specification; matter printed in italics indicates the additions made by reissue.

CROSS-REFERENCE TO RELATED APPLICATIONS

*This is a reissue of U.S. patent application Ser. No. 10/013,589, filed Dec. 11, 2011, and issued May 3, 2005, as U.S. Pat. No. 6,889,064, for "COMBINED REAR VIEW MIRROR AND TELEPHONE," which is a* continuation-in-part application of U.S. patent application Ser. No. 09/735,455, filed Dec. 12, 2000 and issued Sep. 23, 2003 as U.S. Pat. No. 6,625,426 for "COMBINED REAR VIEW MIRROR AND TELEPHONE" which in turn is a continuation-in-part of U.S. patent application Ser. No. 09/532,859, filed Mar. 22, 2000 and issued Apr. 15, 2003 as U.S. Pat. No. 6,549,793 for "COMBINED REAR VIEW MIRROR AND TELEPHONE; and [co-pending] *is related to* granted U.K. application GB2356312, the disclosures of which are hereby incorporated by reference.

BACKGROUND OF THE INVENTION

1. Field of the Invention

The present invention relates to mobile telephones or cellular telephones used in automobiles. More particularly, the present invention relates to a hands-free mobile telephone or cellular telephone unit for use in an automobile. Even more particularly, the present invention relates to a remote device and computer process for communicating with an automobile via a wireless connection.

2. Description of Related Art

The use of cellular telephones within an automobile is well known as providing a convenient means of communication. To better serve drivers, mobile telephones have been mounted in a number of places within an automobile. For instance, cellular telephones have been placed in the center console between the driver and the passenger seats or alternatively on the dashboard. Yazaki U.S. Pat. No. 5,418,836 discloses a combined radio and telephone unit that is mounted in the center console of an automobile. Lang et al. U.S. Pat. No. 5,202,913 teaches placement of the mobile telephone unit within a recess of a dashboard.

As the road and highways become increasingly crowded, it becomes imperative that drivers be distracted as little as possible. Yet, the use of a cellular telephone by a driver of a vehicle constitutes a significant road hazard, especially during the period when the driver is either dialing or answering the telephone.

To address the problem, a number of attempts have been made to locate the cellular telephone within a vehicle or provide convenient handsfree use. For example, U.S. Pat. No. 4,850,015 teaches a cellular telephone for use in a vehicle where the telephone is mounted on the steering wheel. With the advent of air bags and crowding of numerous other controls upon the steering wheel, such as radio or cruise control, the usefulness of a steering wheel mounted cellular telephone has become minimized.

Attempts have also been made to improve the placement of the telephone, while concealing the telephone when not in use. For example, U.S. Pat. No. 4,905,270 teaches a cellular telephone mounted on a sun visor where the telephone can be hidden from view by tilting the visor up when not in use.

Vehicular cellular telephones have also been designed to allow for hands-free operation or use of the telephone without a handset. For instance, U.S. Pat. No. 4,905,270 teaches a cellular telephone where the microphone is mounted on a vehicle sun visor. Sounds are picked up by the microphone and then FM transmitted to a receiver in the vehicle before the communication signal is sent outside the vehicle.

While present day attempts have been made to improve the convenience of a cellular telephone's location within a vehicle, as noted above, such attempts have failed to improve the overall safety associated with dialing and answering the phone. In this regard, no significant attempt has been made to control the ability to use the telephone, itself, as well as other vehicle functions from a remote site for operational safety. Particularly, present day car telephones have failed to provide a meaningful safe method to answer or dial a cellular telephone while concurrently viewing both oncoming traffic in the driver's forward field of view and upcoming traffic in the rearward field of view. As detailed hereinbelow, the present invention addresses many of these drawbacks found in the prior art.

SUMMARY OF THE INVENTION

In a first aspect hereof, the present invention provides an improved vehicular telephone which is integrated into a vehicular interior rear view mirror. The mirror cellular telephone is a cellular telephone integrated into the rear view mirror, and generally comprises:

(a) a rear view mirror frame or housing, said frame including a rear view mirror, (b) cellular telephone means, (c) dialing means for dialing and answering the telephone disposed within the frame of the rear view mirror, and wherein a driver can either voice dial and answer a call while monitoring road conditions in both a forward and rearward field of view, or push dial from the cellular telephone mirror frame while the vehicle is stationary or moving.

The present invention also enables a driver to receive or send caller images and road images by sending a forward field of view through a wireless video communication SIM card processor disposed within the rear view mirror frame. The SIM card may be permanently fixed in the rear view mirror housing or be interchangeable with other wireless video communication phones.

The combined rear view mirror and cellular telephone system hereof includes three embodiments, one including an extractable hand-set mounted within the rear view mirror frame or, alternatively, a non-removable cellular telephone system integrated inside the rear-view mirror frame. Either embodiment may include a wireless video communication device. In a third embodiment hereof, a video camera is integrated into the mirror housing and is used conjointly with the housing and telephone.

In a further embodiment hereof, there is provided a wireless remote system for communicating with a vehicle CPU through the rear view mirror, or vehicle telematics infrastucture. Although the remote device can be applied as a fixed application for cell phone use, paging, and the like, its primary function is retrieving information from the vehicles telematics architecture.

It is thus an object of the present invention to provide means for communicating with an automobile through a remote computer or the like capable of signaling an automobile integrated system such as, remote devices, radio modems, paging receivers, decoders, micro-controllers, receiver chips, microwave receivers, transmitter-receivers, electrical switches, microprocessors, interfaces, enabled devices, inboard computer systems, mobile network servers, GPS, GPRS or 3G receivers, and the like.

Another object of the present invention is to provide a process of communication to a vehicle from a work or home computer via the computer's transmitter-receiver, integrated server, and/or voice processor to all functions of the automobile through a wireless connection.

It is another object of the invention to enable locating the global position (GPS) of the vehicle through an integrated systems placed in the vehicle such as an integrated GPS receiver, computer chip, motion detector, or other function located in the vehicle.

For a more complete understanding of the invention, reference is made to the following detailed description and attached drawing. In the drawing, like reference characters refer to like parts throughout the several views, in which:

BRIEF DESCRIPTION OF THE DRAWING

FIG. 1 is a top plan view, partly in phantom, showing a first embodiment hereof;

FIG. 2 is an elevation view, partly in phantom, of the embodiment of FIG. 1, as viewed by a driver while operating a vehicle;

FIG. 3 is the elevation view of FIG. 2, showing detail of the first embodiment hereof;

FIG. 4 is a top plan view, partly in phantom, showing a second embodiment hereof;

FIG. 5 is an elevation view, partly in phantom, of the embodiment of FIG. 4, as viewed by a driver while operating a vehicle;

FIG. 6 is the elevation view of FIG. 4, showing detail of the second embodiment hereof;

FIG. 7 is a perspective, isometric view, looking downwardly, at and showing a third embodiment hereof;

FIG. 8 is a front elevation view, partly in phantom, of the embodiment of FIG. 7, as viewed by a driver while operating a vehicle;

FIG. 9 is a top plan view, partly in phantom and with a mirror element and a speaker element thereof removed, of the embodiment of FIG. 7; and FIG. 10 is a side elevation view, partly in phantom, of the embodiment of FIG. 7.

DESCRIPTION OF THE PREFERRED EMBODIMENTS

With more particularity, FIGS. 1-3 disclose a first embodiment for an improved cellular telephone in accordance with the present invention and, generally denoted at 10.

It is contemplated that all necessary cellular telephone components, such as the speaker, a microphone, an antenna, as well as all conventional electrical components, handset, sending unit, power source, and alphanumerics are housed within a rear view mirror housing to form a complete cellular telephone.

It is also contemplated that the vehicle audio system may be used with a telematics mirror, as discussed below, for additional adjustments in sound quality.

The cellular telephone system 10 comprises a generally rectangular rear view mirror housing or frame 12 that comprises a front wall 14, and a peripheral side wall 16. The walls 14 and 16 cooperate to form a substantially rectangular enclosure having a hollow interior 19.

A reflective surface or mirror 18 is affixed to or otherwise provided on the front wall 14, the mirror 18 functions as a rear view mirror.

Disposed about the periphery of the side wall 16 are a plurality of openings 20 in which are disposed a plurality of push buttons 30 which correspond to the numbers, symbols and alphabetical array associated with a telephone. Thus, there is provided on the side wall 16, in essence, a linear array of push buttons which correspond to the numbers of a telephone key pad, including both the star and asterisk as well as the pound sign, and include the digits one through zero, thus defining a linear key pad 31.

A microphone grid 32 is also provided on the housing 12 on the side wall 16 thereof which covers a microphone 33 disposed within the housing interior 19.

A speaker grid 35 is also provided on the housing on the side wall thereof which covers a speaker 39 disposed within the housing interior 19.

As shown in FIG. 2 as well as in FIG. 5, disposed within the interior 19 of the housing 12 is suitable electronic circuitry, as illustrated at 34. The electronic circuitry 34 comprises telephone circuitry and includes a circuit board 37 or the like, which provides electrical communication between the key pad 31 and the circuit board 37. An extension cord and plug assembly 36 extends from the circuit board 37.

As shown in FIG. 1, the sidewall 16 is provided with an opening 38, through which is insertable a portable or cellular telephone 40, as described below. The opening 38 provides access to a pocket 42 formed within the interior of the housing 12.

As shown in FIGS. 1 and 2, disposed within the interior 19 of the housing 12 are a pair of spaced apart side tracks 50, and 52 and a rear wall 54. The tracks 50, and 52 and the rear wall 54 are integrally formed and cooperate with the front wall 14 to define the pocket 42. Thus, the pocket 42 cooperates with the tracks to slidingly receive the cellular telephone 40.

The rear wall 54 of the pocket 42 defines a stop for limiting the degree of insertion of the telephone 40.

The cellular telephone 40 is of a conventional configuration having a plug socket 60 formed therewithin and which has a pronged configuration complementary to that of the plug assembly 36 associated with the circuit board 37 to enable the telephone to be rendered in electrical circuitry or communication with the electronics provided by the circuit board, thereby enabling the electronics associated with the housing 12 to override any of the circuitry associated with the telephone itself. Thus the telephone is operable via the keypad disposed on the sidewall.

It is to be noted in this regard that the actual configuration of the circuitry is not critical hereto and such is well known to the skilled artisan. What is critical hereto is that the telephone be rendered operable through the circuitry associated with the mirror housing and be actuable via the key pad associated with the housing.

A mounting assembly 61 is provided to enable the mounting of the instant mirror to the windshield or other suitable location on a vehicle. A power source, such as a battery and, preferably at the vehicle battery (not shown), is used to power the telephone when it is being operated from the housing. In other words, the electronic circuitry 34 is powered by a suitable source, preferably a vehicle battery, through a suitable and well-known wiring connection.

It is to be appreciated that according to this embodiment, the telephone is removable from the pocket where necessary, but at all other times, when placed in electronic communication with the circuit board it has its operation controlled at the mirror itself without the need for access in the telephone, per se.

It is readily seen that a phone may be permanently installed behind the mirror, if desired.

The telephone 40, per se, used in the practice of the present invention is preferably a conventional hand held cellular telephone.

As discussed below, optionally, the mirror 18 can be a telematics mirror where the mirror is display screen itself, or can be in communication with another display screen for displaying e-mail, stock quotes and similar information accessed by and received by the telephone through a wireless web or the like.

Thus, the mirror 18 is a telematics mirror it can receive or send worded or numeral messages sent from a computer, conventional telephone, cell phone, or any remote device.

Where the mirror is a display screen, the display screen, preferably comprises a liquid crystal display and a backlight. This structure is well known to the skilled artisan.

Referring now to FIGS. 4-6 there is depicted therein a second embodiment of the present invention. This embodiment adopts the same components and concepts as the first embodiment (FIGS. 1-3) except that the second embodiment accommodates an interchangeable SIM ("Subscriber Identity Module") card denoted at 62 to enable the driver to use the same card, either while driving, by inserting the SIM card 62 into a drawer 66, and the SIM card when assembled to the drawer 66 into a pocket 63 through a door 64 formed in the housing 12 (FIG. 4); and when the driver is away from the vehicle, by removing the SIM card from the pocket 63 and inserting the SIM card into an ordinary mobile telephone, wherein to connect and place the SIM card in operable relation with telephone circuitry. Optionally, the automobile cellular circuitry may be completely hidden in the vehicle as long as the SIM card 62 and circuitry are used together for security reasons. In the event the vehicle is stolen no telephone calls can be made. In this regard, the SIM card 62 may temporarily replace the vehicle voice response capabilities.

Referring now to FIGS. 7-10, there is illustrated a third embodiment of the present invention. According to this embodiment a video camera device 65 is disposed on the housing for transmitting video communication images. A screen viewer 70 is slidingly disposed and storable in the pocket 42 to receive video images and is in electrical communication with the camera 65.

The video camera 65 can transmit both a forward and a rearward field of view. Referring to FIG. 7, the video camera 65 is shown mounted for movement relative to an X-Y-Z coordinate axis system, wherein the X-axis is aligned with the forward and rearward ends of the vehicle, the Y-axis extends from side-to-side and across the dashboard of the vehicle, and the Z-axis is perpendicular to the road. The camera 65, so mounted, is rotatable and orientable in a range of 360° relative to the Z-axis (i.e., in the X-Y plane), and may rotate 13° up and down relative to the Y-axis (i.e., in the Z-X plane).

It is to be appreciated that according to this embodiment, the screen viewer is slidingly removable from the pocket when necessary. It is further contemplated that the video screen viewer 70 may be interchangeable with a portable video communications telephone (not shown). Such a screen viewer video communications telephone may be in communication with any computer webcam for real time communication.

In practicing the present invention, it is preferred that the mirror 18 comprise a "telematics" mirror. By the term "telematics" is meant that the mirror 18 and cellular telephone circuitry 34 are in direct communication with any inboard vehicle computer system, software, computer chip, sensor, transmitter, receiver, microprocessor, decoder, micro controller, enabled device, pager receiver, electrical switch, or vehicle mobile network server system for displaying features, such as vehicle location, route guidance information via satellite navigation, GPS, GPRS and other vehicle bus protocols through a wireless connection. Such an arrangement, also, enables remote vehicle diagnostics, data acquisition and analysis, fleet management, and vehicle data recordation.

When the mirror 18 is a telematics mirror, the mirror may have touch dialing and biometric capabilities located on the mirror surface. The touch screen may include voice response capabilities, and be used with or without a SIM card reader. The biometrics. capability may comprise a fingerprint card which can be used in the same manner as the SIM card 62, or be integrated into the mirror surface 18, such capability enabling onboard verification of a fingerprint and thus the wireless identification of an individual by means of the telephone. Optionally, the biometrics application may be disposed anywhere on the mirror in a solitary function for driver convenience.

The telematic mirror and circuitry may communicate with a remote device, computer, or land-line outside the vehicle carriage using a preferred coded orally spoken or access dialed into the telematic architecture, for implementation and monitoring of all vehicle functions, through any monitoring sensors or devices. Such devices include, for example, computer chips, microprocessors, inboard computer systems, mobile network servers, radio modems, enabled devices, pager receivers, decoders, micro controllers, receiver chips, transmitter-receivers, interfaces, vehicle voice processors, GPS receivers, or other telematics architecture through a wireless connection.

Also, infrared port applications located outside the vehicle, on any remote device, or computer system which can communicate with an infrared port on the telematics mirror 18 may be implemented herein. By using a telematics mirror, there is enabled e-mail retrieval, worded or numeric messages, recorded calls, vehicle start signals, GPS, GPRS location, RPM interrupt, climate control, security system monitoring, fluid levels, tire pressure monitoring, and the like.

The remote device may comprise a docking unit when located inside the vehicle at certain times, and define a Global Interface Function (GIF).

In the event of vehicle theft, or a police chase the vehicle may be halted immediately using a remote device such as by retrieving the GPS location of the vehicle on a global basis for RPM interrupt or retrieving vehicle GPRS location information and relaying it to the remote device from anywhere in the telematic infrastructure, in the event the vehicle occupant is stranded in a dangerous situation without the access to communicate for assistance, or other means such as, MESA (Mobility for Emergency and Safety Application).

It is to be appreciated that the telematics mirror, when associated with a remote device monitoring the vehicles system, may transmit verbal signals to relay to the vehicle owner (outside the vehicle carriage) the status of vehicle functions and vehicle information, through a vehicle voice notification process coming through the remote device, from the telematics infrastructure.

Thus, in a further aspect hereof there is provided a computer process for controlling vehicle functions from a remote site, such as a home or work computer, through a telematics transmitter-receiver process, using vehicle software accessed through a wireless connection. The software for controlling a vehicle coincides with the remote site software. The remote site can also include a web site application download, CDR, a computer operating system, a network system, an internet access and the like. Furthermore, it is possible that the telematic transmitter-receiver process be a global process. In use, the telematics system is accessed by dialing or orally accessed through a voice processor to retrieve all vehicle information from the telematics architecture. The returned vehicle information can then be related to the operator of the vehicle to provide vehicle status, either visually or orally, such as fuel level, tire pressure or the like either by displaying it at the remote site or on the rearview mirror.

Furthermore, through the wireless connection it is also possible for a display screen mirror to send and receive information which can then be both visually displayed or orally relayed using a voice response system through the speaker system of the vehicle.

By incorporating the appropriate circuit into the circuitry 34, it is also possible to enable the mirror to conduct two-way radio function, as well as call ID functions that appear on the display screen surface.

Although not shown, it is also possible for a lap top computer to be plugged directly into the rearview mirror and or SIM card circuitry to retrieve e-mail and similar information from the wireless web through an Internet Data Center.

It is also contemplated that the telematics mirror have scanner-receiver capabilities, as a free frequency system using digital or analog, as well as FDMA, TDMA, CDMA, GSM, and the like. This includes any new frequencies transferring voice and data between computers (bluetooth) at no less than 720 kilobits per second, with or without the use of a standard radio modem.

Similarly, it is yet further contemplated, that the telematics mirror be adapted to have two-way capabilities to communicate with another telematics mirror, using a signaling process. In this regard, the signal for an incoming communication may come from another telematics mirror having infrared capabilities. The signal for an incoming communication appears in the mirror surface or through voice notification. Voice response may accept or refuse such communication, using the mirror microphone or vehicle speaker for voice amplification. It is to be appreciated that personalized access numbers or GPS code can be integrated into such a system for deciding whether or not to accept the communication. It is readily apparent that the present system, when using GPS technology provides rescue and route guidance monitoring.

The present mirror may be in direct communication with an onboard computer system such as the Panasonic CF-27 located in a police vehicle, which, in turn, is in direct communication with the National Crime Information Center in Washington D.C., USA and various national offices to enable vehicle information access to law enforcement agencies. This would allow a vehicle owner to register his or her vehicle access codes with those agencies responsible for recording such information.

While the invention has been illustrated in detail in the drawing and in the foregoing description, the same is to be considered as illustrative and not restrictive in nature. It is understood that only the preferred embodiments have been shown and described fully and that all changes and modification that come within the spirit of the invention are desired to be protected.

Having thus described the invention, what is claimed is:

1. A combined rear view mirror and telephone apparatus for a vehicle having a windshield to enable a hands-free operation of the telephone by the driver of the vehicle, comprising:

(a) a rear view mirror housing, said mirror housing including an exterior surface, an interior, and a pocket for accommodating a SIM card, said pocket having an inlet that opens on said exterior surface, (b) cellular telephone means fixedly integrated, at least in part, into the interior of said mirror housing, (c) a SIM card reader in the interior of said mirror housing, said SIM card reader being in electrical circuit relation with said cellular telephone means, (d) a SIM card door formed in the *mirror* housing for closing said inlet, (e) a SIM card drawer for transporting a SIM card, said drawer being insertable into the inlet and removably receivable in the pocket of said mirror housing [wherein] to place the SIM card in electrical circuit relation with the SIM card reader, and (f) attachment means for attaching the mirror housing to the vehicle in juxtaposition with the windshield.

2. The combined rear view mirror and telephone apparatus of claim 1, wherein the SIM card is adapted to be placed in electrical telephonic circuit relation with said cellular telephone means when the SIM card is disposed in the mirror housing and also with telephone circuitry of a portable mobile telephone when disposed in said *portable* mobile telephone and said *portable* mobile telephone is not in the combined rear view mirror and telephone apparatus.

3. The combined rear view mirror and telephone apparatus of claim 1, wherein said mirror housing includes a front wall that faces rearwardly and towards the driver and a back wall that faces forwardly and towards the windshield, and which further comprises:

a mirror disposed on the front wall of the *mirror* housing, a video camera for transmitting video images, said video camera being positionable for viewing and communicating forward and rearward fields of view as well as the image of the driver, and a screen viewer removably mounted in said mirror housing, said screen viewer and video camera being in electrical communication with one another and with said cellular telephone means for displaying and receiving images from the video camera and transmitted and received from a remote sender via the cellular telephone means.

4. The combined rear view mirror and telephone apparatus of claim 3, said mirror housing further comprising a second pocket having an inlet that opens on said exterior surface, each of said pockets being adapted to receive one and the other of said SIM card and said screen viewer and simultaneously place both the SIM card and the screen viewer in electrical circuit relation with the cellular telephone means and also to complete a wireless connection with a remote location to enable the sending of information as output and receiving of information as input at the vehicle from the remote location.

5. The combined rear view mirror and telephone apparatus of claim 4 wherein said information sent from the vehicle as output is sent via a wireless communication channel that comprises a Bluetooth protocol.

6. The combined rear view mirror and telephone apparatus of claim 3 and further comprising electrical power means to operate the cellular telephone *means*.

7. The combined rear view mirror and telephone apparatus of claim 5 wherein said mirror includes a reflective surface and comprises a display panel, the display panel being telematic and the mirror surface being a touch surface for enabling touch dialing capability, said telematic mirror being in communication with said cellular telephone means and with at least one service provider remote to said vehicle

[wherein] to establish a wireless communication link between the vehicle and the remote service provider.

8. The combined rear view mirror and telephone apparatus of claim 7 wherein the touch surface of said telematic mirror is interactive and adapted to respond to a driver input, said driver input being at least one of touch dialing of a desired phone number or wireless confirmation of driver identity by fingerprint recognition.

9. The combined rear view mirror and telephone apparatus of claim 8, the apparatus further comprising a key pad, the key pad having a plurality of individual push buttons being associated with the electronic means, said telephone apparatus being operable via either the push buttons or touching the touch screen of the telematic mirror.

10. The combined rear view mirror and telephone apparatus of claim 7 wherein the mirror housing includes at least one electrical component, said at least one electrical component being in electrical circuit relation with said cellular telephone means and at least one of a vehicle computer system, vehicle software, vehicle computer chip, vehicle sensor, or vehicle mobile network server system for displaying information from said electrical component on said telematic mirror, and said cellular telephone means is interactive and adapted to transmit and receive information received from said at least one electrical component to a remote server.

11. The combined rear view mirror and telephone apparatus of claim 10, said electrical component comprising:

at least one of a sensor for providing information about the status of a predetermined vehicle function, a geographic positioning (GPS) transmitter, a GPS receiver, general [racket] *packet* radio service (GPRS), an engine ignition starter, an engine RPM interrupt, an antenna, and a microphone, and wherein the output from said electrical component is displayed on said telematic mirror.

12. The combined rear view mirror and telephone apparatus of claim 10 wherein the remote server comprises at least one of an e-mail provider, an Internet Web site, a network system, a radio modem, Mobility for Emergency and Safety Application (MESA), National Crime and Information Center, and a vehicle emergency repair center.

13. A combined rear view mirror and telephone apparatus for a vehicle having a steering wheel spaced below a windshield to enable a hands-free operation of the telephone by the driver of the vehicle when steering the vehicle, comprising:

(a) a vehicle interior rear view mirror assembly, said mirror assembly comprising a mirror housing *having an exterior surface*, a reflective mirror element affixed to the exterior *surface* of said housing, and electronic telephonic circuitry for transmitting and receiving signals to and from a source remote to the mirror housing, said mirror housing having an interior chamber for receiving at least in part said electronic telephonic circuitry, a socket having an inlet opening on said [housing] exterior *surface*, said socket extending into the [housing] interior *chamber* and sized to receive an end portion of *a* video apparatus having a video viewing screen, a front wall juxtaposed with said windshield, and a rear wall facing said driver and upon which said mirror element is affixed;

(b) a video camera mounted to said mirror housing for transmitting video images, said video camera being in electrical circuit relation with said telephonic circuitry and said video apparatus when said video apparatus is within said socket, said video apparatus comprising one of a separably removable viewing screen and a portable cellular video telephone having a viewing screen integrated within the video telephone;

(c) a video phone SIM card processor disposed in the *mirror* housing, said SIM card processor for operating and sending images from said video camera to said [viewer] *video* apparatus when said [viewer] *video* apparatus is within said socket and said video phone SIM card processor is in electrical circuit relation with said video camera; and (d) a keypad for actuating said portable cellular video telephone when said video telephone is disposed in said socket and in electrical circuit relation with said telephonic circuitry.

14. The combined rear view mirror and telephone apparatus of claim 13 further comprising:

(a) a circuit board disposed in the *mirror* housing and defining electronic means; and (b) a plug assembly extending from the circuit board and being connectable to the video camera and said video [viewer] apparatus to render the video telephone operable by the electronic means.

* * * * *